Aug. 14, 1928.
E. COOKENMASTER
BUSHING REMOVER
Filed Sept. 9, 1926
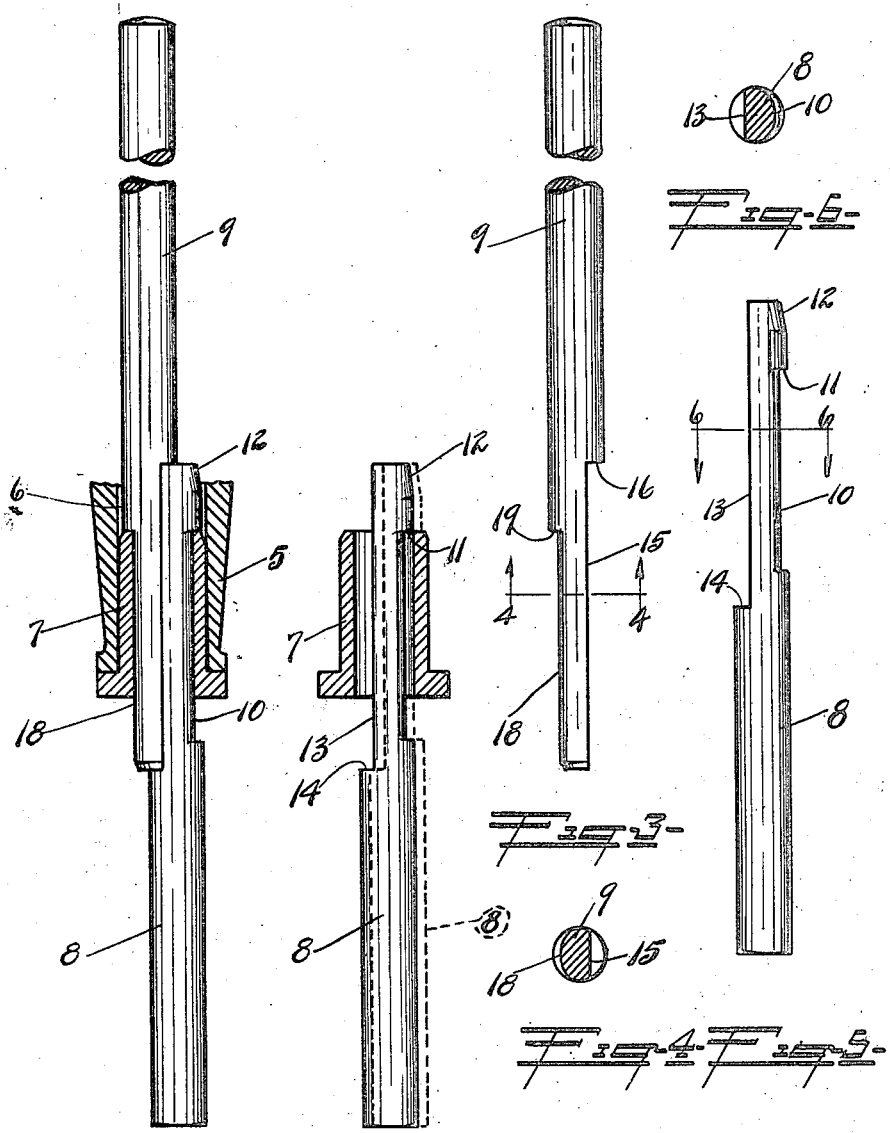

Patented Aug. 14, 1928.

1,680,320

UNITED STATES PATENT OFFICE.

EDMOND COOKENMASTER, OF FAIRGROVE, MICHIGAN.

BUSHING REMOVER.

Application filed September 9, 1926. Serial No. 134,400.

The present invention relates to improvements in bushing extractors, and has for an object to provide improved co-operating implements by means of which the bushings can be quickly and efficiently driven from the various housing and members in which they are mounted.

It is another object of the invention to provide twin implements which are fitted through the bore of the housing or member, in opposite directions, and co-operate to grasp the bushing, and drive it from its position in the housing where it lodges very tightly, and is only with the greatest difficulty removed by the use of tools now employed for this purpose.

A further object of the invention lies in providing simple and inexpensive implements of the above described character, which will not require expert use, and which will not mar or mutilate the bushings.

With the above and other objects in view, the present invention consists in the combination and arrangement of parts, hereinafter more fully described, illustrated in the accompanying drawings, and particularly pointed out in the appended claims, it being understood that changes may be made in the form, size, proportion and minor details of the parts, without departing from the spirit, or sacrificing any of the advantages of the invention.

In the drawings wherein like symbols refer to like or corresponding parts throughout the several views.

Fig. 1 is a vertical sectional view through a cast member showing my improved implements in place for driving the bushing therefrom.

Fig. 2 is a side view of one of the implements shown inserted in a bushing, the full lines showing its position when first inserted, the dotted lines illustrating the position it assumes when the cooperating implement is inserted to force it to position for extracting the bushing which is shown in cross section.

Fig. 3 is a side view of the other implement.

Fig. 4 is a section taken on the line 4—4 of Fig. 3.

Fig. 5 is a side view of the implement shown in Fig. 2, and

Fig. 6 is a transverse sectional view taken on the line 6—6 of Fig. 5.

Referring now particularly to the drawings, the numeral 5 indicates a housing or member which is provided with a central bore 6 to receive the bushing 7. In automobiles particularly it is necessary that these bushings be renewed from time to time as wear takes place, and it is the prime object of this invention to provide for their ready displacement.

The invention resides in the provision of bushing grasping implements 8 and 9 respectively, made of suitable material and of a shape and sizes to fit within the bushing as clearly shown in the drawing, the member 8 being turned as shown at 10 to form a shoulder 11, adapted when the implements are in proper position to engage the end of the bushing, the top being slightly tapered as shown at 12 to facilitate its insertion into the base of the bushing, the opposite side of the implement is flatted as shown at 13, forming a shoulder 14 intermediate its length, and for a purpose to be presently described.

The implement 9 is formed of round stock similar to the member 8 and is also flatted as shown at 15, forming a shoulder 16, which, when the members are assembled and inserted in a bushing for the removal thereof, engages the end 17 of the member 8, the flat side 15 co-operating with the flat surface 13 of the member 8, the opposite side of said member being also turned as shown at 18 forming a shoulder 19 which butts against the end of the bushing.

In practice the member 8 is first inserted in the bushing, and is then shifted transversely (as shown in dotted lines in Fig. 2) so that the shoulder 11 engages the end of the bushing, the flat side 15 of the member 9 is then placed against the flatted surface 13 of the member 8, and until the shoulder 19 engages the end of the bushing, and the shoulder 16 strikes the end 17 of the implement 8, the operator then strikes the end of the implement to loosen and drive the bushing from its seat, the force of the blow on the member 9 being communicated to the member 8 by reason of the butting relation of the shoulders 16 and 17.

The tools of course are suitably hardened, and are made in various sizes to fit the standard bushings.

From the foregoing description it will be obvious that I have perfected a very simple, inexpensive and convenient bushing remover.

What I claim is:—

In a bushing remover, the combination of cylindrical driving and driven members, one end of the driving member having a flatted section adapted to form a shoulder, the opposite side having a shorter turned section forming a bushing engaging shoulder, there being a flatted section and shoulder formed on one side of the driven member and adapted to engage the flatted section on the driving member, the opposite side having a rounded section the upper end of which is shouldered and tapered to engage a bushing, the end of each member engaging the shoulder formed on the other member.

In testimony whereof I affix my signature.

EDMOND COOKENMASTER.